J. D. HENDRICKS.
IMPLEMENT FOR FORMING GROOVES IN PLASTIC MASONRY.
APPLICATION FILED NOV. 29, 1919.

1,383,301.

Patented July 5, 1921.
2 SHEETS—SHEET 1.

WITNESSES
W. C. Fielding
P. E. Liggers

INVENTOR
John D. Hendricks
BY
E. G. Liggers
ATTORNEY

J. D. HENDRICKS.
IMPLEMENT FOR FORMING GROOVES IN PLASTIC MASONRY.
APPLICATION FILED NOV. 29, 1919.
1,383,301.
Patented July 5, 1921.
2 SHEETS—SHEET 2.
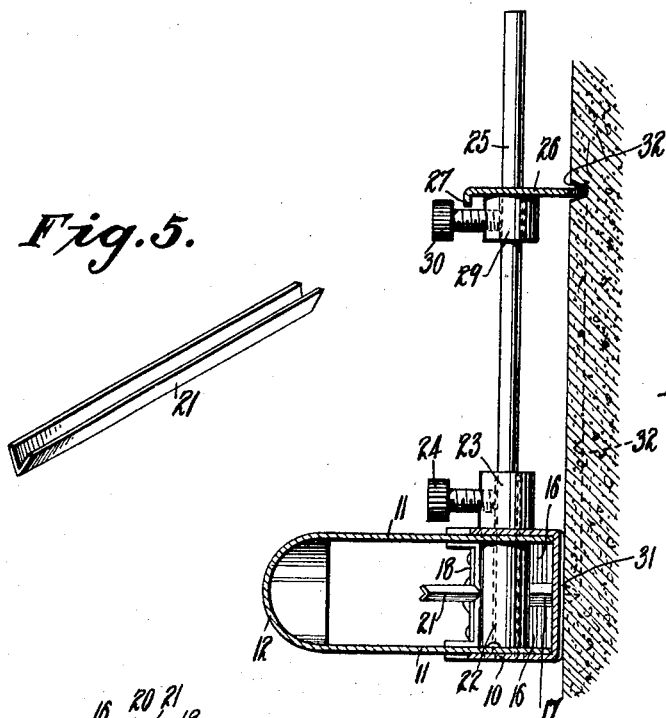
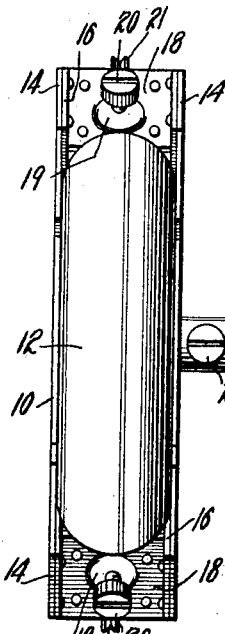
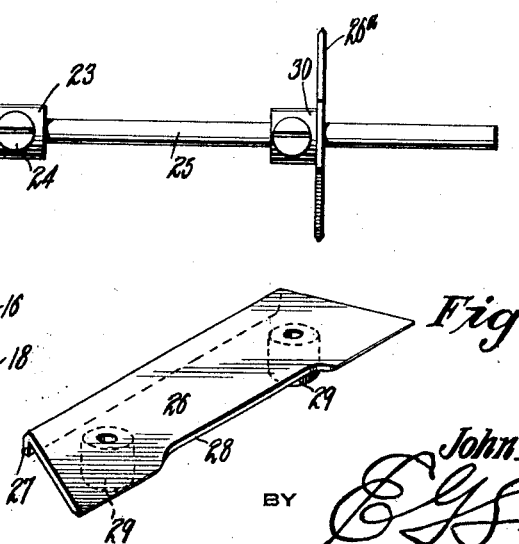
WITNESSES
W. C. Fielding
P. E. Siggers
INVENTOR
John D. Hendricks
BY
E. G. Siggers
ATTORNEY

UNITED STATES PATENT OFFICE.

JOHN D. HENDRICKS, OF MIAMI, FLORIDA.

IMPLEMENT FOR FORMING GROOVES IN PLASTIC MASONRY.

1,383,301. Specification of Letters Patent. Patented July 5, 1921.

Application filed November 29, 1919. Serial No. 341,354.

*To all whom it may concern:*

Be it known that I, JOHN D. HENDRICKS, a citizen of the United States, residing at Miami, in the county of Dade and State of Florida, have invented a new and useful Implement for Forming Grooves in Plastic Masonry, of which the following is a specification.

This invention relates to implements for forming grooves or channels in plastic masonry, and is an improvement on the patent granted to me November 5, 1918, No. 1,283,761.

The primary object of the invention is to provide a tool especially adapted for making imitation tiling for bath rooms, kitchens, etc., which will have a cutter at each end so that the operator may back up into a corner and go ahead to the opposite corner without changing the guide, and which will embody certain improvements in the cutting mechanism of the tool, which improvements serve to reduce the cost of manufacture and enable the tool to be more rapidly operated.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawing:—

Fig. 3 is a sectional view on the line 3—3 of Fig. 1.

Fig. 4 is a top plan view of a modified form.

Fig. 5 is a perspective view of the groove-forming bit employed with the present invention.

Fig. 6 is a perspective view of the gage runner.

The numeral 10 indicates a frame or casing which forms the main body of the implement, and is substantially U-shaped in cross section, but has a flattened under side designed for riding over the surface of the plastic material.

Figure 2:
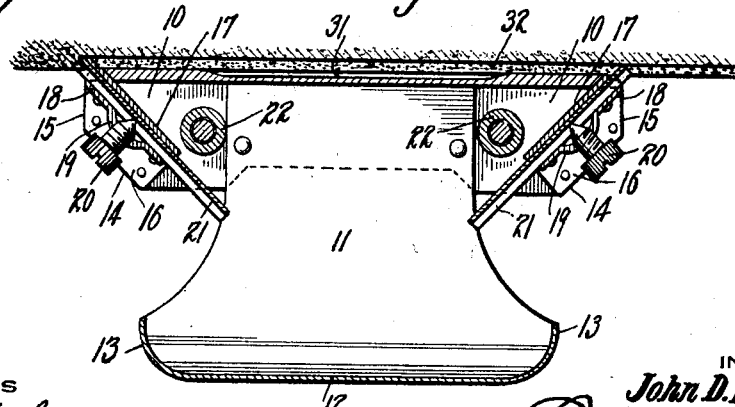
Fig. 2 is a sectional view on the line 2—2 of Fig. 1.

11 is a handle, also substantially U-shaped in cross section, which is shown as having a rounded upper wall 12, with front and rear ends 13 also rounded off and depending toward the frame, and side walls riveted to the inner sides of the upright walls of the frame 10, as illustrated in Figs. 2 and 3.

Figure 1:
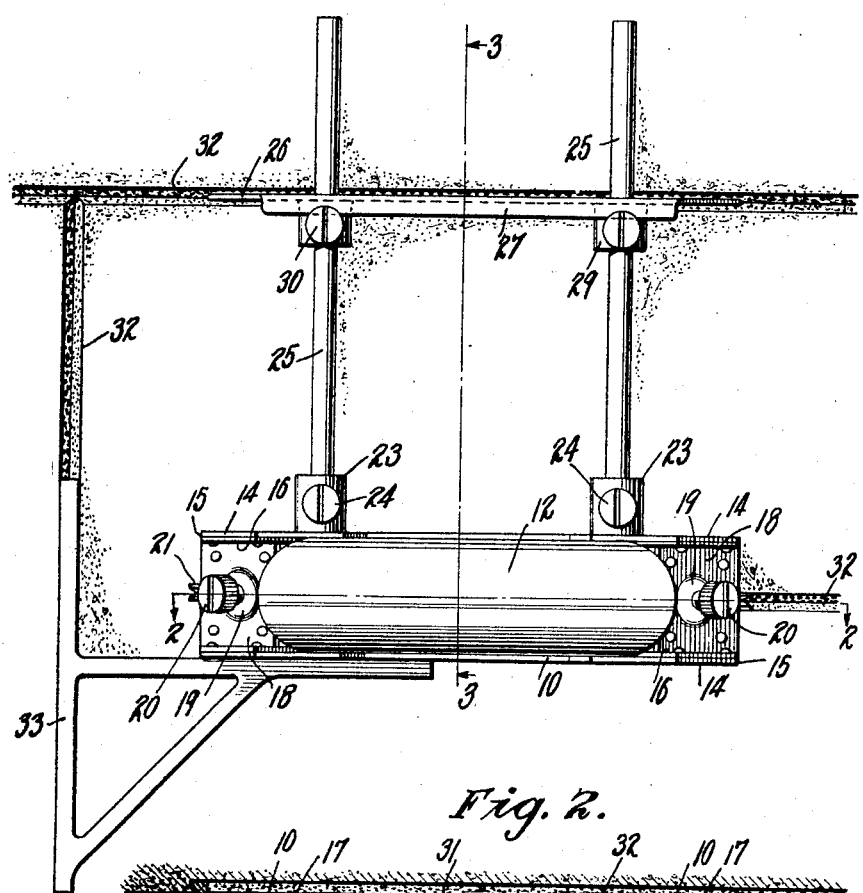
Figure 1 is a top plan view, showing the preferred form of the invention in the act of making a groove or channel in the wall.

Both ends of the frame 10 are constructed alike, being provided with beveled edges 14 and with vertical edges 15. Comprehended between these edges of the ends of the boxing are bit-supporting plates 16 having upturned flanges secured in any desirable way to the frame, as seen in Figs. 1 and 2. The angle at which these supporting plates are set within the frame is approximately 45°, and it is at this angle that the cutting bits are held. Each supporting plate is provided with a longitudinal groove 17 substantially V-shaped in cross section. A holding plate 18 is made fast upon each supporting plate, so as to overlie substantially all the groove 17, and to form a passageway with the same for the reception of the bit. The central portion of the holding plate is provided with a boss 19, provided with screw threads to receive a set screw 20. The inner pointed end of the set screw 20 when screwed down, bears directly upon a bit 21 seated in the groove 17 beneath the plate 18. The bit can thus be held in any desired position subject to the guiding of the groove 17. The bit is V-shaped in cross section with the grooved side facing outwardly, and hence the pointed end of the set screw is received within the groove of the bit, as shown in Fig. 2.

Extending transversely of and within the frame and secured thereto in any desirable way, are a pair of collars 22, each having an extension 23 on one side projecting beyond the frame. These collars have a central longitudinal bore. The extensions 23 are each provided with a set screw 24 whereby gage rods 25 are held adjustably therein. The gage rods are fixed in parallel relation so as to maintain the gage runner 26 in exact parallelism with the bits 21.

The gage runner, as seen in Fig. 6, comprises a substantially flat plate having an upper flange 27, a cutaway section 28 in its lower or groove-engaging edge, and a pair of projecting collars 29. The collars 29 are of sufficient length to prevent any movement of the gage runner with respect to the gage rods except along the same. The function of the cutaway section 28 is to allow the gage runner to ride over unevennesses which may occur in the grooves. The under face of the frame 10 is provided with a recess 31 intermediate its ends for a similar purpose, namely, to enable the frame to remain substantially level when variations in the level of the wall are encountered.

In the modification disclosed in Fig. 4 but one gage rod carrying a small gage runner 26ª is shown. Otherwise, the construction is substantially that of the implement previously described.

In using the implement, the gage runner is placed in a groove previously formed and set at the desired distance from the bits 21. The implement is then pushed along the wall to form the grooves, as at 32, being further guided if necessary by a T-square 33, as shown in Fig. 1. The depth of the cut is regulated by projecting the end of the bit inwardly or outwardly. The grooves will be substantially V-shaped in form, corresponding to the cross section of the bits.

In the construction disclosed in the patent previously referred to, but one bit is used, and this was clamped intermediate the ends of the tool. The result was that when the workman got up into a corner, he encountered difficulty in finishing the groove. With the present device, the bits are at the extreme end, and either or both may be used for working in either direction. When a corner in a room has been reached, instead of lifting the implement up and turning it about, the other bit may be used to work in a reverse direction.

Another feature which is not found in the patented device, is the depression which is provided in the under face of the frame, and the cutaway section which the gage runner is formed with. These permit slight inequalities in the level of the wall to be passed over without interfering with the depth and appearance of the grooves formed by the bit.

An additional difference lies in the peculiar manner of clamping the present bit in a V-shaped groove in a supporting plate. This V-shaped groove conforms exactly with the shape of the bit and in coöperation with the holding plate holds the bit without any tendency to wabble or get out of alinement.

Still another feature is the specific shape of the bit 21. As shown in Fig. 5, it is a true V in cross section, differing in this respect from the bit of the patented device. The latter was designed particularly to imitate brick work, as on exterior surfaces of buildings and the like, and is not suitable for imitating tiling and interior work. The present bits are adapted to form shallow V-shaped grooves to give the pleasing tile effect which is so desirable.

The construction of the frame and handle is an important feature of the present invention. It provides a lighter and cheaper construction and one that can be more readily manufactured.

What is claimed is:—

1. A hand implement for forming grooves in plastic surfaces comprising a body, a handle therefor, bits secured at each end of said body and being of materially less width than said body, both of said bits having their active ends extended below the bottom and beyond the ends of the body whereby both bits may be brought into action simultaneously in forming a single groove in plastics.

2. A hand implement for forming grooves in plastic surfaces comprising a body, a handle therefor, bits secured at each end of said body, both of said bits having their active ends extended below the bottom and beyond the ends of the body whereby both bits may be brought into action simultaneously to form a single groove in plastics, said body having a flat bottom adapted to lie against and slide over such surfaces without marring the same, the implement itself being of a size and shape to be held by the hand whereby tiling and the like may be imitated manually.

3. In combination with an implement for forming grooves in plastic surfaces, said implement having a frame, a bit adjustably secured to said frame, said bit having a V-shaped cross section whereby grooves of a corresponding shape are formed, a supporting plate for said bit, said supporting plate having a V-shaped bit-seating groove, a holding plate for the bit secured over the supporting plate to overlie the groove therein and form a passageway with the same for the reception of the bit, and means for clamping the bit in the groove.

4. In an implement for forming grooves in plastic surfaces, the combination with a frame substantially U shaped in cross section, of a handle also substantially U shaped in cross section, the side walls of the handle being secured to the side walls of the frame with the rounded wall of the handle uppermost, and means for securing a bit to said frame.

5. In an implement for forming grooves in plastics surfaces, a substantially U-shaped frame, a collar traversing the frame near each end and secured transversely to the sides of the frame, one end of the collar projecting through an opening in the frame side, a gage rod fitted into said collar, means on the projecting end of the collar to engage the rod to hold the same in adjusted positions with respect to the collar, and a gage runner fitting upon and adjustable along said gage rod.

6. In an implement for forming grooves in plastic surfaces, a frame carrying groove-cutting bits at each end, said frame having a recess on its under face intermediate its ends, and a gage runner secured in parallelism to said frame and adapted to run in a previously formed groove, said gage runner having a cutaway portion provided on its groove-engaging edge intermediate its ends.

7. In an implement for forming grooves in plastic surfaces, a frame of substantially U-shaped form having a flat under surface, said under surface being provided intermediate its ends with a recess, bit-securing means at each end of the frame, said means holding said bits to project below and beyond the ends of the frame, gage rods secured transversely with respect to the frame and held parallel to each other and extending from one side of the frame, and a gage runner adjustable along said rods, said gage runner having a groove-engaging edge, said edge being provided with a cutaway portion, the recess of the frame and the cutaway portion of the gage runner allowing the implement to ride over inequalities in said surfaces.

8. In an implement for forming grooves in plastic surfaces, the combination with a frame substantially U-shaped in cross section, of a handle also substantially U-shaped in cross section, the side walls of the handle being inserted between the side walls of the frame and secured thereto with the rounded wall of the handle being uppermost, and means for securing bits to said frame.

In testimony, that I claim the foregoing as my own, I have hereto affixed my signature in the presence of two witnesses.

JOHN D. HENDRICKS.

Witnesses:
RAYMOND E. BAKER,
ORLO E. HAINLIN.